Patented Dec. 19, 1939

2,183,628

UNITED STATES PATENT OFFICE 2,183,628

ALKYL ESTERS OF LEUCO DIBENZANTHRONE

Otto Stallmann, Bridgeton, N. J., assignor to E. I. du Pont de Nemours & Company, Wilmington, Del., a corporation of Delaware No Drawing. Application May 25, 1938, Serial No. 209,993

4 Claims. (Cl. 260—355)

This invention relates to the preparation of new and valuable compounds of the dibenzanthrone series, more particularly to the preparation of the higher molecular weight aliphatic esters of leuco and other reduction derivatives of dibenzanthrone and its substitution products. The leuco derivatives of dibenzanthrone have been esterified with sulfuric acid esterifying agents to give water soluble leuco derivatives which are stable toward air oxidation but are reconvertible to the original color with acid oxidizing agents. Certain lower aliphatic esters of the leuco derivatives or dibenzanthrone have been prepared. These products, however, are not water soluble and have never been found to be of any value for dyeing fibers. They also have limited solubility in organic solvents and are apparently of no commercial value.

It is an object of this invention to prepare new high molecular weight aliphatic acid esters of the reduction derivatives of dibenzanthrone and its substitution products which contain from 8 to 18 carbon atoms in the alkyl chain and which are valuable as color bodies for the coloring of oils, fats, waxes, and plastic materials exhibiting particularly desirable fluorescence in reflected light.

It is a further object of this invention to prepare oil and organic solvent soluble compounds of the dibenzanthrone series suitable for use in the coloring of materials which cannot ordinarily be colored with vat dyes.

I have found that new and valuable color bodies of the dibenzanthrone series may be prepared by reacting dibenzanthrone compounds in the common leuco form or in the more stable reduced forms with aliphatic acid chlorides of high molecular weight (8 to 18 carbon atoms). The reaction is preferably carried out in the presence of pyridine which forms a pyridinium compound with the acid chlorides and is an excellent solvent for the compound to be reacted. The esterification may be effected at ordinary temperatures, although it is preferably carried out at somewhat higher temperatures. Inert organic solvents may also be employed in the reaction since they serve as solvents for the reaction product from which it may be obtained in a pure form. The resulting esters may be recovered from the organic solvents by evaporation or steam distillation. Where evaporation is employed the mass is evaporated to a thick mass and the desired ester precipitated by the addition of alcohol in which the excess esterifying agent and impurities or by-products which are formed remain in solution and may be removed by filtration.

The stable reduction derivatives of the dibenzanthrone compounds as more particularly described in copending U. S. application Serial No. 186,750, now U. S. Patent 2,148,042, and the non-regeneratable stable reduction derivatives of Bz-2,Bz-2'-dihydroxydibenzanthrone (including the halogenated compounds) described in copending application Serial No. 209,990, filed May 25, 1938, may be esterified in the same manner as the common leuco derivatives. These new high molecular weight aliphatic acid esters of leuco dibenzanthrone and of the leuco hydroxydibenzanthrones and the leuco alkoxydibenzanthrones are all soluble in oils and organic solvents with a reddish orange to bright red color, which in reflected light exhibit brilliant greenish yellow through yellow to yellowish red fluorescence.

These products may be hydrolyzed back to the parent ketonic compounds if subjected to severe treatment with strong alkaline or acid hydrolyzing agents. The long chain aliphatic esters of the stable reduction derivative of dihydroxydibenzanthrone may be hydrolyzed under controlled conditions to an intermediate hydrolyzation product which also exhibits desirable green fluorescence. The long chain aliphatic esters of the common leuco derivatives of dihydroxydibenzanthrone are hydrolyzed under somewhat more mild conditions to the original dihydroxydibenzanthrone.

In the preparation of these new and valuable compounds, the commercial aliphatic acids consisting of mixtures of naturally occurring aliphatic acids such as found in coconut oil and other commercial oils may be employed, and the acid chlorides of these higher aliphatic acids or mixtures may be prepared by any of the known methods.

The following examples are given to illustrate the invention more fully. The parts are by weight.

Example 1

10 parts of the dry, pulverized stable leuco compound of Bz-2,Bz-2'-dimethoxydibenzanthrone (the product of Example 1 of co-pending U. S. application Serial No. 186,750, now U. S. Patent 2,148,042, are added at 125 to 130° C. to a solution of 20 parts of crude lauric acid chloride (the reaction product of a crude, technical mixture of coconut oil acids with thionyl chloride) and 200 parts of "Solvent Naphtha". The esterification mass is kept for 4 hours at reflux (130 to 135° C.), while maintaining a carbon dioxide atmosphere above the reaction liquid. It is then cooled to 70° C. and filtered at this temperature. The filtrate is evaporated to dryness and the residual mass is extracted several times with methanol at 40 to 50° C. and then dried at this temperature.

The red colored, stable leuco ester, thus obtained as a dry powder is soluble in oils, gasoline, and many other kinds of organic material and solvents with an orange color in transmitted light, exhibiting a very strong and bright greenish yellow fluorescence in reflected light. It is stable in oil or organic solutions at temperatures up to 180° C., even when exposed to air oxidation and it is not vattable under ordinary conditions. Its solubility in alcohol is very low and the compound is quite insoluble in water. In concentrated sulfuric acid or in boiling alcoholic caustic alkalis, the ester is saponified, giving leuco-dimethoxydibenzanthrone or its hydrolyzation products. The compound is the dilaurate of leuco-Bz-2,-Bz-2'-dimethoxydibenzanthrone.

*Example 2*

25 parts of the same stable leuco derivative as was used in the previous example, are suspended in 25 parts of dry pyridine at 80° C. and 40 parts of crude lauric acid chloride are added slowly within one-half hour at 80 to 85° C. The mass is then stirred at 90 to 95° C. for another one-half hour and 250 parts of benzene are then added. The solution is refluxed for one-half hour at 80 to 85° C. and then cooled to 25° C. and filtered at this temperature. The filtrate is evaporated to dryness and the dry residue is purified by extraction with methanol. The product, thus obtained, is identical with the product of Example 1.

As an alternative isolation method, the benzene filtrate may be steam distilled free from solvent with excess of diluted ammonia, whereby the excess lauric acid chloride is converted into the water-insoluble lauric acid amide, which may be separated from the leuco ester by decanting off the water layer remaining after the steam distillation, and extracting the residual semisolid mass with alcohol. The lauric acid amide may, if desired, be left with the leuco ester, since it serves as a good solvent and dispersing agent for this color, which may then be marketed in the form of a concentrated paste or solution either with or without additional solvents, such as "Tetralin", "Hexalin", or high boiling organic solvents, in which the leuco-laurate is readily soluble.

*Example 3*

100 parts of the same dry, pulverized stable leuco derivative of Bz-2,Bz-2'-dimethoxydibenzanthrone as used in the previous examples, are suspended in 100 parts of dry pyridine, and 150 parts of crude lauric acid chloride are added slowly within one hour at 80 to 85° C. The mass is then heated for one hour at 120 to 125° C., then cooled to 80° C. and 400 parts benzene are then added at 80° C. After refluxing the liquid for one-half hour at 80 to 85° C., the mass is cooled and filtered at 10 to 15° C. The filtrate is distilled until finally the distilling temperature reaches about 130° C. and then cooled to room temperature. 250 parts of methanol are now very slowly stirred into the viscous liquid within two hours and the red precipitate is filtered off and washed repeatedly with fresh methanol. The cake is then stirred to a smooth paste or solution by using as diluent three to five parts of a light motor oil per one part of dry leuco-laurate and by heating the paste or solution at 120° C., allowing any remaining volatile solvents to evaporate.

The product, thus obtained, may be used conveniently for the coloring of oils with a very desirable fluorescent shade by adding small amounts of this concentrated paste to the oil to be colored at room temperatures and without the necessity of heating to effect complete solution. If the leuco-dimethoxydibenzanthrone laurate is to be used for the coloring of other organic material, other diluents may be employed or the product can be used in the dry (100% powder) form, since it has good solubility in a great variety of organic solvents (except alcohols) and in many kinds of plastic and polymerization masses.

Products of similar shade, fluorescence, solubility, and stability are obtained by substituting for the crude lauric acid chloride the chloride of any one of the following "long chain" aliphatic acids:

Caprylic acid,
Capric acid,
Palmitic acid,
Stearic acid,
Oleic acid,
Hydroabietic acid, or a mixture of several of these acids, all of which react readily with leuco-dimethoxydibenzanthrone in the presence of pyridine to form the corresponding leuco-fatty acid esters.

*Example 4*

25 parts of the stable leuco compound of the alkylation product from Bz-2,Bz-2'-dihydroxydibenzanthrone and 1,3-dichloro-2-butene (the product of Example 10 of U. S. application Serial No. 168,750 now U. S. Patent 2,148,042) are suspended in 50 parts of dry pyridine at 80° C. and 50 parts of crude lauric acid chloride are added under agitation within one-half hour at 85 to 90° C. The mass is then heated to reflux for one-half hour, cooled to 80° C. and diluted with 500 parts of toluene. After heating for 10 minutes at 80 to 90° C., the mass is cooled and filtered at 40° C. The filtrate is evaporated to dryness and the residue is extracted with ethyl alcohol until free from alcohol-soluble impurities. The leuco-laurate, thus obtained, is soluble in organic solvents and in oil and other organic material with a reddish to orange color in transmitted light, exhibiting a very strong and bright yellowish green fluorescence in reflected light.

The solubility and stability properties of the product are quite similar to those of the leuco-dimethoxydibenzanthrone laurate, described in the preceding example.

*Example 5*

When 25 parts of the stable compound of the alkylation product from Bz-2,Bz-2'-dihydroxydibenzanthrone and ethylene dibromide (the product of Example 7 of U. S. application Serial No. 168,750, now U. S. Patent 2,148,042) are employed, the laurate of the leuco-vat color is obtained, which is a red solid of similar solubility and stability properties, but of somewhat redder and duller fluorescent shade in oil solutions in comparison with the product of Example 1.

Example 6

100 parts of the filter cake, containing 20 parts of the free hydroxy compound of the stable reduction product from Bz-2,Bz-2'-dihydroxydibenzanthrone of co-pending U. S. application Serial No. 209,990 and 300 parts of crude pyridine are distilled under a carbon dioxide atmosphere, until the distilling temperature reaches 117° C. The anhydrous mass is cooled to 100° C. and 30 parts of crude lauric acid chloride are added over a one hour period at 100 to 110° C. under agitation. The esterification mass is then heated for one-half hour at 125 to 130° C., cooled to 25° C., diluted with 200 parts of dry benzene and the deep red colored solution is filtered. The filtrate is evaporated to dryness. A semi-solid residue is obtained which is readily soluble in oil, gasoline and waxes with a red color in transmitted light, showing a very strong reddish brown fluorescence in reflected light.

If instead of evaporating the filtrate to dryness it is steam distilled in the presence of an excess of diluted ammonia, a product is obtained which when dissolved in oil exhibits a very strong yellowish green fluorescence as distinguished from the reddish brown fluorescence of the produce obtained by evaporation of the solvent. This change is attributed to partial hydrolysis of the original lauric acid ester into what is believed to be the mono lauric acid ester of the stable reduction product.

Example 7

50 parts of the dry free hydroxy compound of the stable reduction product of U. S. application Serial No. 209,990 are suspended in 75 parts of dry pyridine, forming a thick but stirrable mass, which is heated to 80° C. 75 parts of crude lauric acid chloride are then dropped into the mass over a one hour period at 80 to 85° C. and the fusion, which becomes more fluid, is heated to 125 to 130° C. for one hour and then cooled to 80° C. 150 parts of dry benzene are added and the solution is refluxed for one hour at 80 to 85° C. It is then further diluted with 200 parts of benzene and then cooled to 25° C. A small amount of solvent insoluble impurities are removed by filtration and the filtrate is distilled free from benzene, until the mass reaches a temperature of 128° C. A viscous, deep red colored mass is obtained, which is cooled to 25° C.

It may be converted into the green fluorescent laurate described in Example 6 by prolonged steam distillion of the mass or by treatment with an acid hydrolyzing agent such as pyridine hydrochloride or diluted hydrochloric acid at 90 to 150° C. until the original brownish red fluorescence of the product when dissolved in oil has changed to yellowish green.

The mono or dibromo derivatives of the stable reduction products of Bz-2,Bz-2'-dihydroxydibenzanthrone described in Examples 9 and 10 of co-pending U. S. application Serial No. 209,990 may be esterified by the same procedure as outline above to give esters having similar properties.

Similar products are obtained by replacing the crude lauric acid chloride in the esterification by other (long chain) aliphatic acid chlorides, such as for instance, the chlorides made from capric acid, caprylic acid, oleic acid, palmitic acid and stearic acid, etc., all of which give esters exhibiting similar fluorescence.

Example 8

22 parts of the dry, pulverized common leuco acid of Bz-2,Bz-2'-dihydroxydibenzanthrone (prepared by acidifying an ordinary alkaline hydrosulfite vat of the intermediate with acetic acid at 40° C., filtering off the red colored, unstable common leuco acid in a carbon dioxide atmosphere, washing the cake free from inorganic salts with water and drying the product in a high vacuum), are suspended in 66 parts of dry pyridine. 66 parts of crude lauric acid chloride are added slowly to the suspension at 80 to 85° C. and the mass is heated at reflux temperatures for one-half hour and then cooled to 80° C. 100 parts of benzene are now added; the solution is refluxed at 80 to 85° C. for 20 minutes and then cooled to 25° C. and filtered. The deep red colored filtrate is distilled until the temperature of the mass rises to 101° C. and the residual mass is extracted several times with 100 parts of methanol. The remaining, alcohol-insoluble, dark colored solid is believed to be the tetra-laurate of leuco-dihydroxydibenzanthrone. It is readily soluble in organic solvents, oils, gasoline, and other organic material with a deep red color, exhibiting a strong red fluorescence.

Unlike the product of Example 6, this product is not converted to a green fluorescent laurate, but instead it is converted back into dihydroxydibenzanthrone when stored for a prolonged period of time exposed to air and light, or when treated with strong alkaline or acid hydrolyzing agents.

Example 9

2 parts dibenzanthrone, 1 part zinc powder, 3 parts dry pyridine, and 1 part "Solvent Naphtha" are mixed under agitation and heated to 80° C. 3 parts of lauric acid chloride are then slowly added and the mass is refluxed for one-half hour. The oil soluble color which is formed is extracted from the pyridine fusion mass with benzene. The pyridine and benzene are steam distilled off and the resulting product is filtered and dried. It may be further purified by dissolving in benzene and precipitating with methyl alcohol. This product is quite soluble in oils and the usual organic solvents with an orange color exhibiting bright yellow fluorescence in reflected light.

The leuco laurates of isodibenzanthrone and isodimethoxydibenzanthrone may also be prepared by this process. They exhibit desirable fluorescence when dissolved in organic solvents, oils, waxes, etc.

The products of the foregoing examples are particularly useful where oil soluble colors are desired. In the coloring of certain types of artificial plastic masses they are incorporated with the materials in the presence of strong oxidizing agents, at elevated temperatures which reconvert the leuco ester into the original ketonic compound, making this type of color available for use in products in which the compound in its common keto or stable leuco sulfuric acid ester form cannot be employed. The compounds are particularly suitable for coloring of oils, fats, waxes, plastic masses, regenerated cellulose and cellulose derivatives.

In the specification and claims the broad term leuco dibenzanthrone compounds is used to designate the leuco derivatives of both dibenzanthrone and isodibenzanthrone compounds.

Inorganic or organic bases may be employed in the esterification reaction. The reaction, however, may be effected in inert organic solvents with the aliphatic acid chloride without the use of alkaline condensing agents. The use of such bases as pyridine, piperidine, dimethylaniline, quinoline, etc., is preferred over the inorganic base since they form soluble reaction products with the excess acid chlorides employed.

I claim:

1. Aliphatic acid esters of leuco dibenzanthrone compounds and their stable derivatives in which the aliphatic ester side chain contains at least 8 carbon atoms and is attached through the leuco oxygen in the dibenzanthrone nucleus.

2. Lauric acid esters of leuco dibenzanthrone compounds in which the ester group is attached to the dibenzanthrone nucleus through the leuco oxygen.

3. The dilaurate of leuco Bz-2,Bz2'-dimethoxydibenzanthrone.

4. The process for preparing long chain aliphatic acid leuco esters of dibenzanthrone compounds which comprises reacting a compound of the class consisting of leuco dibenzanthrone compounds and the stable reduction derivatives with a long chain aliphatic acid compound of the class consisting of aliphatic acid chloride and anhydrides.

OTTO STALLMANN.